United States Patent [19]

Strain

[11] 4,120,793
[45] Oct. 17, 1978

[54] POLLUTING OIL RECOVERY APPARATUS
[76] Inventor: Patrick J. Strain, 27 Tanglewood Dr., Ottawa, Ontario, Canada
[21] Appl. No.: 627,846
[22] Filed: Nov. 3, 1975
[51] Int. Cl.² ............................................. E02B 15/04
[52] U.S. Cl. ............................. 210/175; 210/DIG. 25; 210/242 R
[58] Field of Search ................. 210/83, 242, DIG. 25, 210/175

[56] References Cited
U.S. PATENT DOCUMENTS

| | | | |
|---|---|---|---|
| 2,876,903 | 3/1959 | Lee | 210/242 |
| 3,651,943 | 3/1972 | DiPerna | 210/242 |
| 3,726,406 | 4/1973 | Damberger | 210/242 |
| 3,754,653 | 8/1973 | Verdin | 210/242 |
| 3,847,816 | 11/1974 | DiPerna | 210/242 |
| 3,890,234 | 6/1975 | Galicia | 210/242 |
| 3,922,225 | 11/1975 | Strain | 210/242 |

Primary Examiner—Theodore A. Granger
Attorney, Agent, or Firm—Kerry Maxwell Hill

[57] ABSTRACT

A method and apparatus for recovering oil spills on water comprising surrounding an oil spill with booms attached to a recovery vessel having sluice gate openings in its bow and then moving the vessel into the oil spill while applying pumping suction action at the openings to draw the oil into the vessel. The oil and any water entering the vessel with the oil is directed along a horizontally disposed and heated conduit where the oil is allowed to seek its natural level above the water. Baffle means are provided along the conduit to entrap the oil above the water from whence the oil is drawn off to a storage and settling tank. A U bend is formed in the conduit to recover any remaining oil in the system before the water is discharged from the vessel.

1 Claim, 2 Drawing Figures

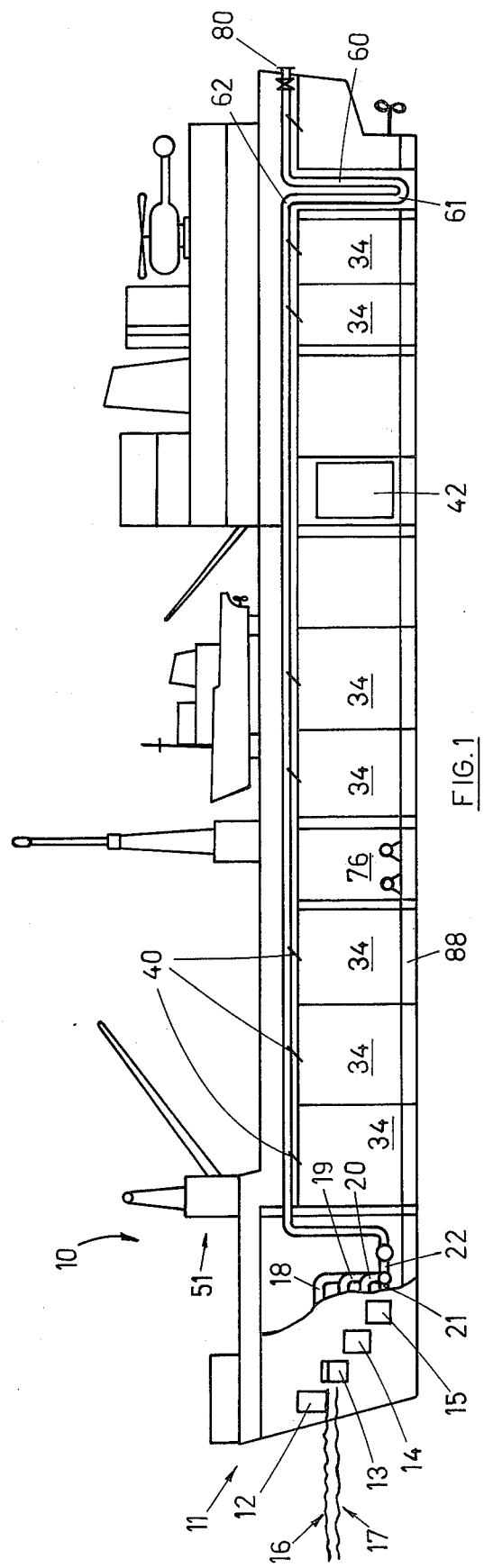
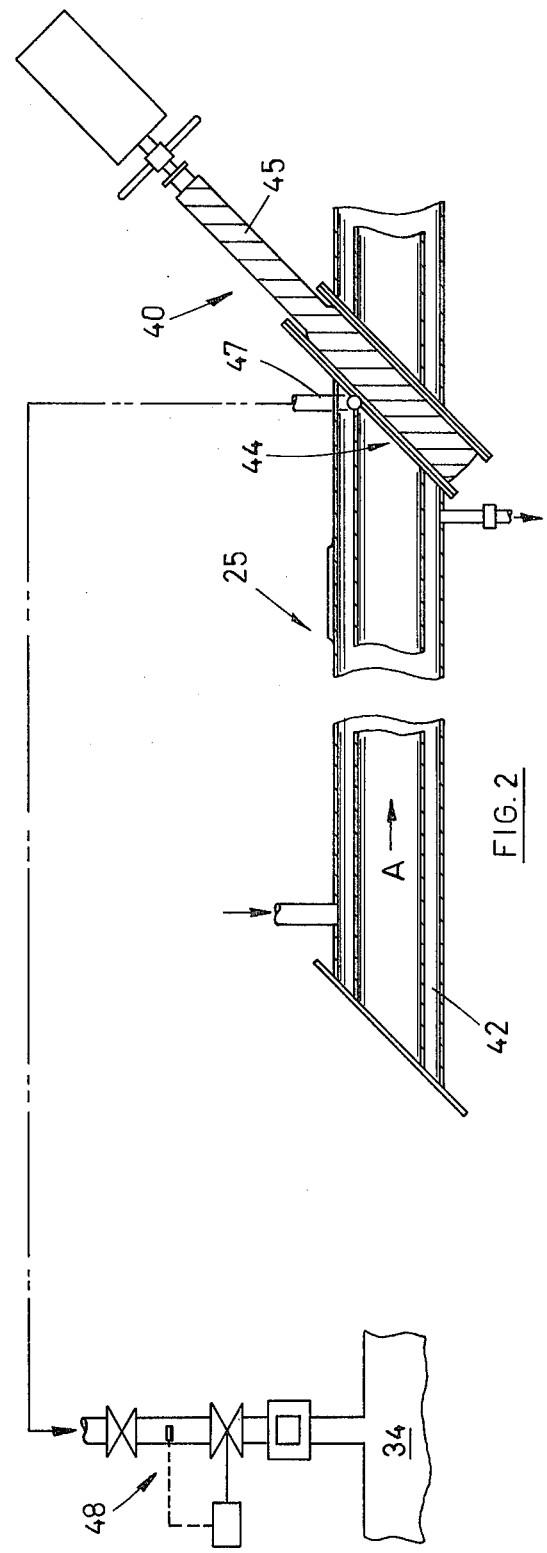

POLLUTING OIL RECOVERY APPARATUS

FIELD OF INVENTION

The present invention relates to a system and apparatus for controlling and recovering oil spillages on large bodies of water. In particular the invention herein provides a ship-based apparatus for recovering spillages of oil resulting from the (a) grounding, rupturing, collision or sinking of oil tankers; or (b) the mechanical failure of off shore oil wells.

It is known that oil on water can be recovered or blotted up provided the recovery process is begun before the oil has dispersed over a wide area and there are devices for recovering or blotting or absorbing oil spills on water provided the spill is not extensive.

The known methods and devices are not capable of reclaiming or recovering the oil from the spillage of a large disaster at sea since they are incapable of recovering the great spillage before the oil disperses.

OBJECT OF THE INVENTION

It is the principal object of the present invention to contain a massive oil spill by a system of booms while a large ship or ships picks up the oil from within the booms before the oil spreads and disperses. Another object is to allow the reclaimed oil to be recycled for future commercial use.

SUMMARY OF THE INVENTION

After a series of booms has enclosed or partly enclosed a patch of spilled oil on the water, the recovery ship, to the sides of which the booms are attached, advances bow forward into the oil. A series of sluice gates are provided at the bow into which the oil flows from the patch. The oil with water drawn into the sluice gates of the ship is pumped into a heated conduit directed within the ship toward its stern. Within the conduit a series of baffle means are deployed as valves to allow water to pass along the conduit but having a means to draw off any oil which has sought its natural position on the surface of the flowing water-oil mixture in the conduit. As a final separation means, a U bend is provided to the conduit travelling downward into the bottom of the ship and upwards again to a water discharge outlet. As the mixture is allowed periodically to rest in the U bend the remaining oil in the mixture settles in the upper portion of the U bend from whence it is extracted from the mixture. More than one U bend can be provided in each conduit if necessary.

IN THE DRAWINGS

With the objects above set forth in view the invention herein is embraced in the method and apparatus exemplified in the embodiments hereinafter described with reference to the accompanying drawings in which similar reference numerals refer to similar parts.

FIG. 1 is a longitudinal sectional elevation of an oil recovery ship showing the sluice gates at the bow and the recovery conduit connected thereto.

FIG. 2 is a side sectional view of the conduit showing the positioning of the adjustable baffle therein and the positioning of the oil take-off system leading to the separated oil storage tank.

PREFERRED EMBODIMENT

In FIG. one of the drawings a large oil recovery ship is shown in section and designated numeral 10. On either side of the bow 11, of ship 10 a series of sluice gates 12, 13, 14 and 15 are shown with gate 13 shown partly opened to allow oil from the oil level 16 to flow into the opening in the bow provided by gate 13. Water from sea level 17 will also mix with the oil as the ship's bow rides into a patch of spilled oil. The gates open downwards and overlap one another. The gates are controlled to allow maximum oil to enter the ship. One gate is opened and the next closed as the oil and water mixture enters the ship lowering it in the water. Each sluice gate is fitted with a wire mesh screen strainer to prohibit flotsam from entering the ship.

The sluice gates 12, 13, 14 and 15 are connected to a manifold pipe 22 directed into a conduit pumping means 23 by pipes 18, 19, 20, and 21 respectively. The pump 23 provides suction to the oil and water mixture entering the ship and pumps it into a conduit 25.

The conduit 25 extends clear through the ship 10 and is valved at the stern where it may be connected to one or two long hoses which can discharge water or oil to a waiting tanker. According to circumstances such as the volume of the oil spill, the availability of tankers in ballast in the area of the spill, provide several alternatives in the utilization of the separation conduit 25. Thus for example, assuming the control ship of FIG. 1 has an oil capacity of 20,000 tons, if that is the amount of the spill substantially all the oil may be picked up, separated in conduit 25 and fed into the storage tanks 34. When transference of the oil is desired it can be pumped from the tanks (which will be interconnected) and fitted with steam heated connections and heating coils) through a discharge conduit connected to the pump room 76. Under another set of conditions, involving a bigger oil spill, it may be desired first to fill the tanks 34 and then, when they are filled to continue the separating process in the main conduit 25 but with the object of filling a waiting tanker with re-claimed oil, such tanker being conduit connected to the stern valve 80 from which, as already indicated, waste or excess water picked up at 16 may also be discharged.

In a third situation, one in which speed of pick-up transcends the importance of effecting the second separation at the time in the conduit 25, the oil and water mixture from the first separation is pumped clear through from 16, through the whole length of the separating conduit 25 to be discharged through the stern valve 80. However, in order not to impede the movement of the oil and water mixture, the separating baffles 40 will be slid out of obstructing position. If desired, after the spill has been cleaned up, the oil mixture in the waiting tankers can be reintroduced at the bow end of the control vessel 10, separated in conduit 25 and passed from the tanks 34 through back into the tankers as reclaimed oil.

The conduit 25 extends longitudinally amidship if there is only one. If there are two they will be disposed centrally and symmetrically in parallel. If there are three, the additional two will be disposed on eith side of the central conduit. On either side of the oil tanks 34 are sea ballast tanks and within the ship's bottom will be additional sea ballast tanks 88. The aforesaid tanks being to achieve the required trim of the vessel having regard for the height of the horizontal plane of the conduit 25. Boilers 92, main engine room 94, oil boom stage 96, crew accommodation 98, tugs to handle booms 100, main and between decks 102 and 104 and oil pollution equipment stage 106 are conventional.

The pipe manifold 21, pipes 18, 19, 20 and 21 and conduit 25 are steam jacketed and a boiler 42 is provided in the ship to serve the steam jackets. In FIG. 2, a steam jacket 42 is shown surrounding the section of conduit 25.

A series of baffles 40 are provided along the length of the conduit 25 and deflect the oil into an upper corner of the conduit 44 where the angled baffle plate 45 entraps the oil. Arrow A indicates the direction of the flow of the oil water mixture and the baffle plate are set at a forward facing angle in the conduit to provide a "corner" at the upper surface of the conduit to entrap the oil in the mixture in the conduit which will naturally seek the upper level.

A draw-off pipe 47 leads from corner 44 of the conduit baffle structure to the oil separation tanks 34 of the ship and suitable pumping and valving means is provided in the pipe line 47 to carry away the oil entrapped by the baffle plate 45.

The flow of drawn-off oil by pipe 47 can be controlled by valve 48 with a sight glass provided to indicate the volume of oil being drawn off and as a means of indicating the required pumping force to obtain the maximum quantity of oil from the mixture as it flows along with the water continuing along under the partially raised baffle.

In the figure the baffle is shown in the fully closed or down position but the operation it will be raised to allow water to pass along as the oil, entrapped at 44 is drawn off. When the mixture is mostly water the baffle will be raised high but when little water is in the mixture it is lowered toward the bottom of its travel until pipe 47 is discharging at maximum capacity to tanks 34. Excess oil then passes with water along conduit 25 to the next baffle where separation is repeated. Finally the water is discharged at 80.

At the stern section of the conduit 25 a U bend 60 is provided having a baffle valve 62 in the bow or forward leg 61 of the bend. As the oil and water mixture is allowed to fill the leg 61 which is also steam jacketed, the heated oil rises to the top of the leg and is trapped as before by the baffle where it can be drawn off while the water flows downward and then up the other leg.

OPERATION OF THE APPARATUS

When a patch of oil is sighted in the water, two booms, one on each side of the bow of the control ship, are connected to the boom anchor point angle bars 51. The ends of the booms are arranged to move vertically along the bars, to allow the booms to float freely at all times. The other end of the boom on the starboard side is connected to a point on a starboard tug (or boom boat) and the other end of the boom on the port side is connected to a point on a port tug.

The tugs fan-out from the ship in a forward direction, towards the oil patch, or slick, and enclose it as much as possible. As the pollution control ship 10 moves forward, the oil strikes the booms thereby directing the oil towards the two particular sluice valves, one on each side of the bow, which are partly open to just below the ship's waterline at the time. The oil, and possibly some water, then flows by gravity, through the wire mesh screen, over the "gate" of the sluice valve, through the steam-jacketed suction pipes, to the pipe manifold. From the manifold the oil is pumped through a strainer to the separation conduit pump suction inlet.

The oil/water mixture is then pumped through the steam-jacketed spearation conduit to a first separation baffle valve.

As the heated oil/water mixture moves along the conduit towards the baffle valve, there is a natural tendency for the lower specific gravity oil to separate from the water and to move along the inner top of the conduit.

The first baffle valve is opened just enough to collect the maximum amount of oil, whilst at the same time allowing the maximum amount of oil/water mixture to pass along to the next baffle valve. This process is repeated at each baffle valve, to the end of the separation conduit if necessary.

The draft of the ship can be trimmed by use of ballast tanks and the oil separation tanks as necessary. Normally, when the ship is empty and preparing to load with polluted oil, the lowest sluice valves will be fully, or partly, open. As the ship starts to fill with oil, these valves will be gradually closed and the next set of sluice valves opened. This process can be repeated until the "gates" of the top set of sluice valves are just below the ship's waterline when in the fully loaded condition, with the valves in the closed position.

Where it is found necessary, valve 48 can be automatically controlled by a water/oil sensor fitted in pipe 47 and arranged to shut-in the valve when an excessive amount of water flows through the pipe.

Control valve 80 is adjusted to allow the water to be discharged back to the sea or river. Should any oil reach valve 80, the valve can be shut and the separation pump 23 slowed sufficiently to allow the baffle valves to handle the large flow of oil. The oil/water mixture could also be discharged through a buoyant flexible hose, inside the boom via the tug or directly to a tanker.

What I claim is:

1. A means for recovering oil spilled upon a large water surface such as an ocean, bay, river, lake or the like, comprising in combination;

a vessel having a stern and a bow with storage tanks disposed therebetween;

a plurality of sluice gates opening on either side of said bow to allow oil and water from said water surface to enter into said vessel;

at least one conduit having a bow end and a stern end, and being horizontally disposed the length of said vessel, wherein said bow end is attached to said sluice gates in fluid communication therewith and wherein said stern end is attached in fluid communication therewith to a water discharge means at the stern of said vessel;

a water discharge valve in said conduit stern end to allow control of the discharge of water from said vessel;

at least one U-bend in said conduit downwardly disposed the depth of said vessel and located adjacent the stern thereof;

suction pump means constructed and arranged to draw an oil and water mixture into said sluice gates and pump said mixture along said conduit;

a steam jacket surrounding said conduit to heat the said mixture therein; baffle means in said conduit downwardly and forwardly adjustable from an upper side of said conduit to entrap a layer of oil therein while water is drawn out along the lower side of said conduit, and pipe means having one open end therein entering and communicating with said conduit proximate the upper side thereof adjacent the forward facing portion of each baffle means, and having another end communicating with a storage tank, and pump means to draw off said layer of oil entrapped in said conduit and to conduct it through said pipe to said storage tank.

* * * * *